July 18, 1967 H. RUSKIN 3,331,233

TOOL FOR APPLYING FASTENING DEVICES

Filed Dec. 1, 1964 5 Sheets-Sheet 1

INVENTOR.
HENRY RUSKIN

BY J. Walton Bader

ATTORNEY

INVENTOR.
HENRY RUSKIN
BY J. Walter Bader
ATTORNEY

TOOL FOR APPLYING FASTENING DEVICES

Filed Dec. 1, 1964 5 Sheets-Sheet 3

INVENTOR
HENRY RUSKIN
BY J. Walter Bader
ATTORNEY

TOOL FOR APPLYING FASTENING DEVICES

Filed Dec. 1, 1964

INVENTOR.
HENRY RUSKIN
BY J. Walton Bader
ATTORNEY

TOOL FOR APPLYING FASTENING DEVICES

Filed Dec. 1, 1964

INVENTOR.
HENRY RUSKIN

BY

J. Walton Bodes

ATTORNEY

United States Patent Office 3,331,233

Patented July 18, 1967

3,331,233

TOOL FOR APPLYING FASTENING DEVICES

Henry Ruskin, Cranford, N.J., assignor to Swingline Inc., Long Island City, N.Y., a corporation of New York Filed Dec. 1, 1964, Ser. No. 415,029
10 Claims. (Cl. 72—410)

ABSTRACT OF THE DISCLOSURE

A tool for applying fastening devices is shown which is designed primarily to apply security clips to string tags. The machine includes a body having an elongated mechanism therein for the reception of the fastening devices. A spring-loaded follower is disposed within the mechanism and a pivotally movable cover disposed about the mechanism. At the forward end of the mechanism, a pair of pivotally movable complementary jaws are provided. These jaws are moved through a pair of links which are wedge-shaped. The links move the jaws into compressed relationship. The links are disposed on opposite sides of the mechanism so that the fastening devices can be moved into actuating position between the jaws by means of the follower. A handle is provided to actuate the links. A stroke control mechanism is operatively connected with the jaws and prevents the operator from applying less than a full jaw closure stroke at any one time. The stroke control mechanism includes an actuator having a plurality of spaced teeth thereupon, an inclined portion behind the teeth, and a springable ratchet member abutting the teeth.

*Description of the invention*

This invention relates to a tool for applying fastening devices and has particular application to a plier for the application of security clips to conventional "string tags" that are placed on garments by stores to identify the merchandise in the case of return and to prevent the garments from being worn by the purchaser prior to the date of return. The instant invention is particularly applicable for use in applying the security clips disclosed and claimed in my co-pending application Ser. No. 413,777, filed Nov. 25, 1964.

The instant invention discloses a number of novel features not heretofore utilized in mechanisms of the class described and will be summarized seriatim:

(a) The jaws of the device within which a fastening device is disposed just prior to driving the same apply equal pressure to the fastening device. In conventional devices such structure is not present. Where the instant device is used to drive security clips the failure to provide structure for production of equal jaw pressure will not permit the security clips to be driven properly.

(b) Novel stroke control mechanism is provided in the device which is simple and precise in operation.

(c) Means are provided in connection with the jaws of the device which cause the fastening device to be retained therein while being driven.

(d) The parts of the device are simple and inexpensive to manufacture permitting the sale of the device at a reasonable price.

The above constitutes a brief description of the invention and the objects and advantages thereof.

The invention will now be further described by reference to the accompanying drawings which are made a part of this specification and represent the best mode known to the inventor of taking advantage of his invention. In this connection, however, the reader is cautioned to note that the specific form of this invention as set forth in this specification is for illustrative purposes and for purposes of example only. Various changes and modifications could obviously be made wtihin the spirit and scope of this invention and would occur to those skilled in this art.

Referring now to the drawings.

Figure 20:
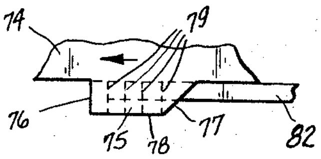
FIG. 20 is a detail view of the area indicated on FIG. 13 but with the ratchet member engaging the first tooth of the first actuating member as said member moves in a forward direction.
Figure 21:
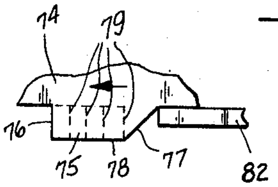
FIG. 21 is a view similar to that of FIG. 20 but with the ratchet member leaving the last tooth upon the first actuating member as the said member continues to move in a forward direction.
Figure 22:
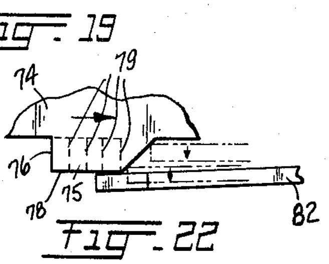

FIG. 22 is a view similar to that of FIG. 20 but showing the ratchet member abutting the top face of the first actuating member and overpassing the teeth thereupon as the first actuating member moves in a rearward direction. The ratchet member is also shown in phantom lines in the position that it assumes upon the inclined rear face of the first actuating member just prior to its abutting the top face thereof.

The invention will now be described in detail by reference to the specific form thereof as shown in the drawings herein.

The tool 11 of this invention is formed with an elongated magazine 12 having an upper portion 13 and a lower portion 14. A cover 15 is pivotally movable and is permanently connected to magazine 12 by rivet 16. A coil spring 17 is disposed over roller 18 having an axle 19 movably disposed in slot 20. Axle 19 is also selectively disposable in slot 21 at the forward end of magazine 12 so as to secure cover 15 to magazine 12 in closed position.

One end of spring 17 is connected to cover 15 through prong 22 and the opposite end of spring 17 is connected to follower 23 at 24.

Follower 23 is slidably movable within upper portion 13 of magazine 12 and is adapted to abut a plurality of fastener elements 25 (security clips being the preferred form used) which are disposed in successive aligned relationship into a strip 26 and are adapted to lie upon the closed bottom 27 of upper portion 13 of magazine 12.

A pair of complementary jaws 28 and 29 are disposed at the forward end of magazine 12. Jaw 28 is formed with a first pair of spaced actuating portions 30 and 31. Portion 30 is formed with a front part 32 and a rear part 33 and portion 31 is formed with a front part 34 and a rear part 35. Pin 36 is disposed within portion 30 and pin 37 is disposed within portion 31. A projection 38 is carried by portion 30 and a projection 39 carried by portion 31. A spring 40 secured to the lower portion 14 of magazine 12 by rivet 41 abuts actuating portions 30 and 31.

Jaw 29 is formed with a second pair of spaced actuating portions 42 and 43. Portion 42 is formed with a front part 44 and a rear part 45 and portion 43 is formed with a front part 46 and a rear part 47. Pin 48 is disposed within portion 42 and pin 49 is disposed within portion 43. A first recess 50 is carried by portion 42 and a second recess 51 carried by portion 43. Recess 50 accommodates projection 38 and recess 51 projection 39.

A first compressing portion 52 is provided upon jaw 28 which joins actuating portions 30 and 31 and extends thereacross. A second compressing portion 53 is provided upon jaw 29 which joins actuating portions 42 and 43 and extends thereacross.

A prong member 54 is disposed upon jaw 28 and a prong member 55 is disposed upon jaw 29. An upper stop member 56 and a lower stop member 57 are also provided so that the strip of clips will not be propelled out of the magazine.

A handle 72 is provided and is pivotally connected to the tool 11 by rivet 58. A spring 59 is disposed upon rivet 58 and has a projecting portion 60 secured to handle 72 and a projecting portion 61 secured in position upon the bottom of portion 13. Spring 59 normally holds handle 72 in the open position shown in FIG. 13.

Handle 72 is connected to spaced links 73 and 74. Slideway 64 is provided upon one side of magazine 12 and slideway 65 provided upon the opposite side of magazine 12. Link 73 is provided with openings 62 and 63 and link 74 provided with opening 65. Pin 66 passes between handle 72 and link 73 and is disposed within opening 62. Pin 67 passes between handle 72 and link 74 and is disposed within opening 64.

Pin 68 is struck from one side of magazine 12 and pin 69 from the opposite side. Pin 68 is disposed within opening 63 and pin 69 within opening 65.

Links 73 and 74 are provided with tapered front portions 70 which fit into tapered recesses 71 which are provided between adjacent rear portions 33 and 45 and 35 and 47.

Each of links 73 and 74 are formed with a projecting portion 75 having a front face 76, an inclined rear face 77 and a top face 78. A plurality of spaced teeth 79 are disposed upon portion 75 and are parallel to front face 76. Links 73 and 74 can be considered to be a "first actuating member."

A second actuating member 80 is secured to the bottom of portion 13 by screws 81. Member 80 is formed with a recess 81 therewithin and a pair of outwardly projecting portions 82 each having a ratchet member 83 thereupon. Member 80 is made of spring steel and portions 82 abut portions 75 of links 73 and 74.

With the foregoing specific description the operation of this invention will now be explained.

Figures 1, 2, 3:
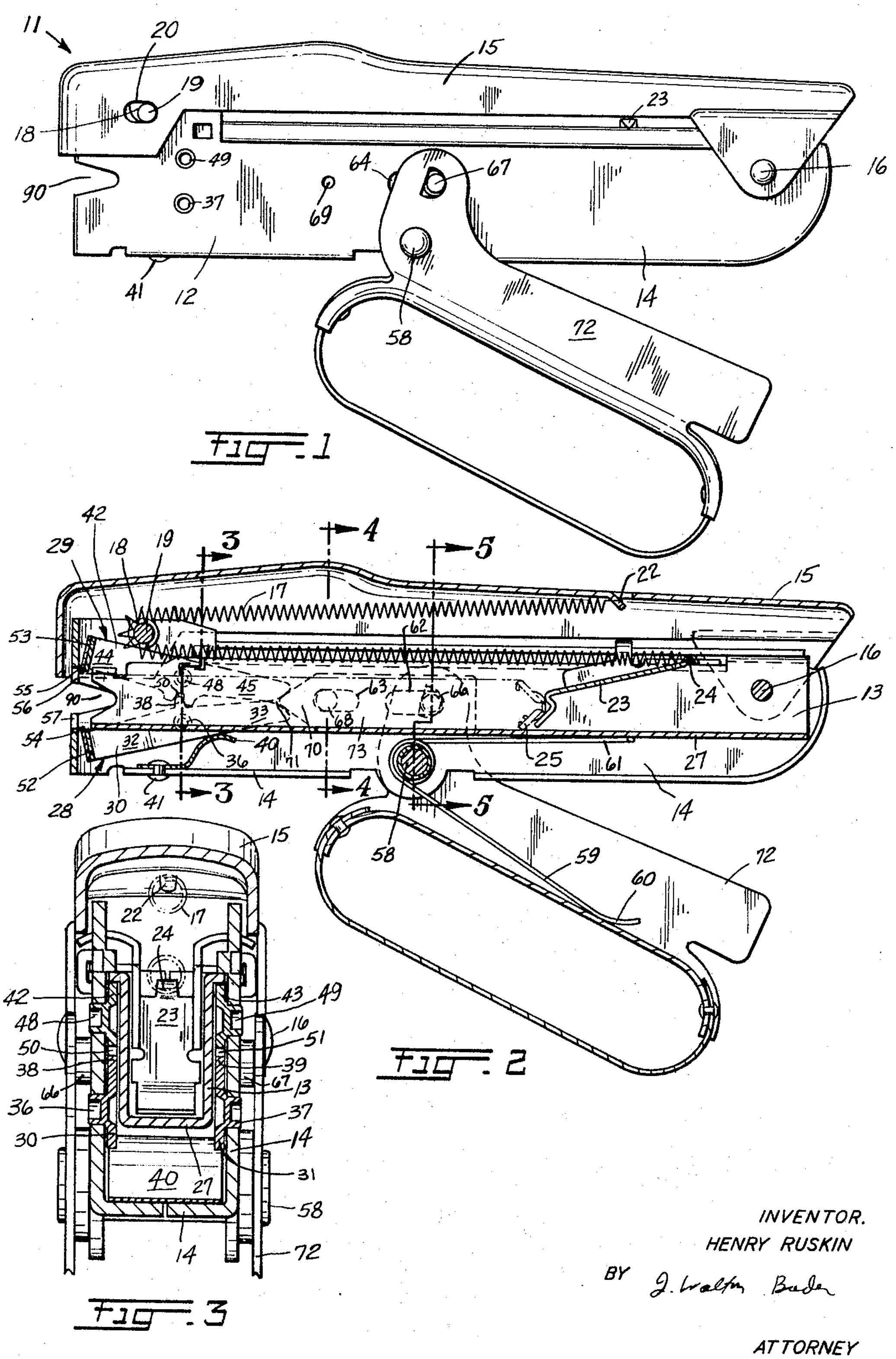
FIG. 1 is a side view of a tool made in accordance with this invention. In this figure the jaws are in normal open position, and the magazine in closed position.
FIG. 2 is a side view similar to that of FIG. 1 but partly in section to show the internal structure.
FIG. 3 is a sectional view taken along lines 3—3 of FIG. 2.
Figure 4:
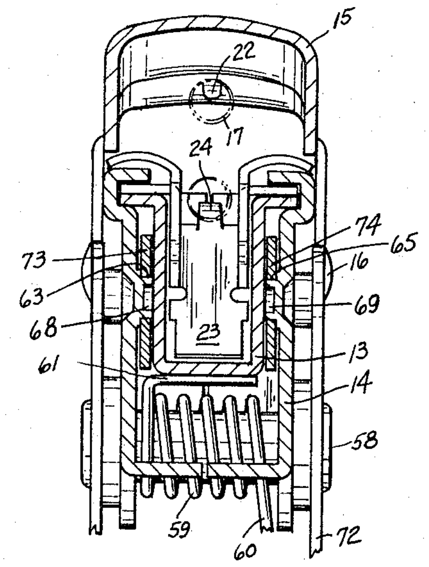
FIG. 4 is a sectional view taken along lines 4—4 of FIG. 2.
Figure 5:
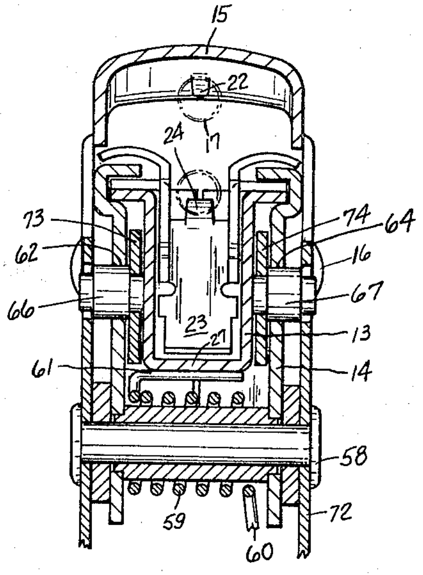
FIG. 5 is a sectional view taken along lines 5—5 of FIG. 2.
Figure 6:
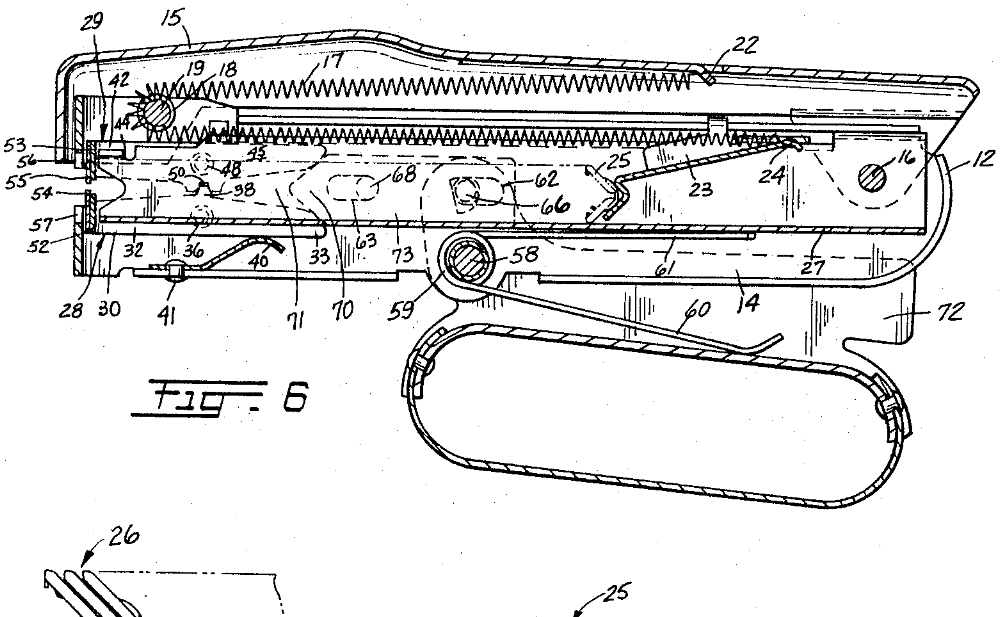
FIG. 6 is a view similar to that of FIG. 2 but with the jaws of the device in closed position.
Figure 7:
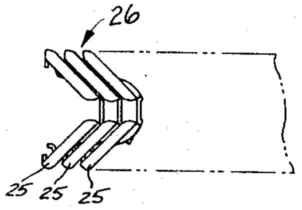
FIG. 7 is a side view of a plurality of security clips in normal unapplied relationship which may be utilized in the tool of this invention.
Figure 8:
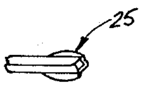
FIG. 8 is a side view of a security clip of the type shown in FIG. 7 in applied relationship.
Figure 9:
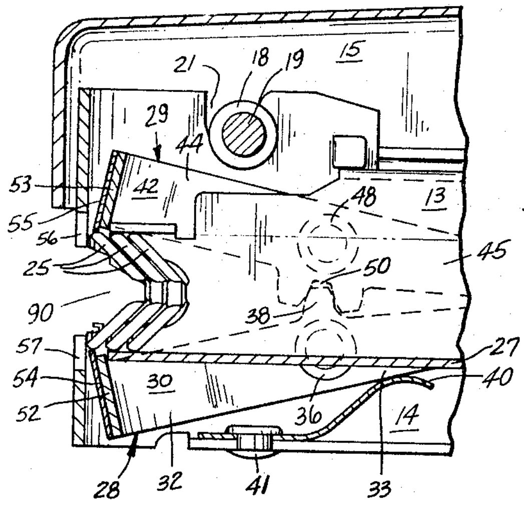
FIG. 9 is a fragmentary side sectional view, on an enlarged scale, showing the jaws of the tool of this invention in normal open relationship with a security clip abutting the jaws ready to be driven.
Figure 10:
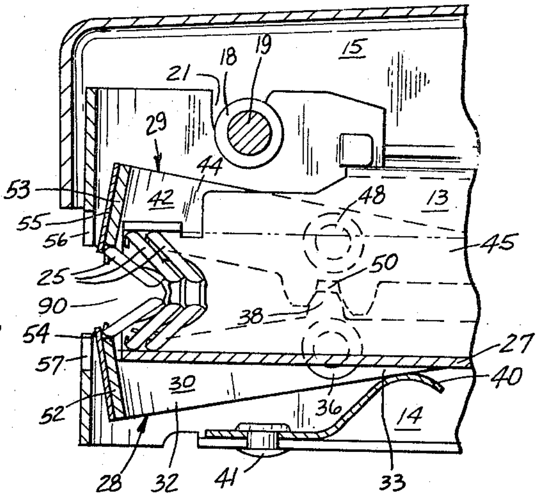
FIG. 10 is a view similar to that of FIG. 9 but showing the position of the jaws as the clip is started to be driven.
Figure 11:
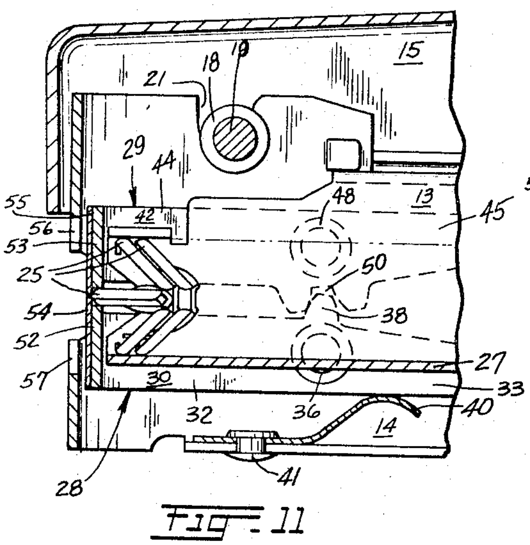
FIG. 11 is a view similar to that of FIG. 10 showing the jaws of the device in full driven relationship.
Figure 12:
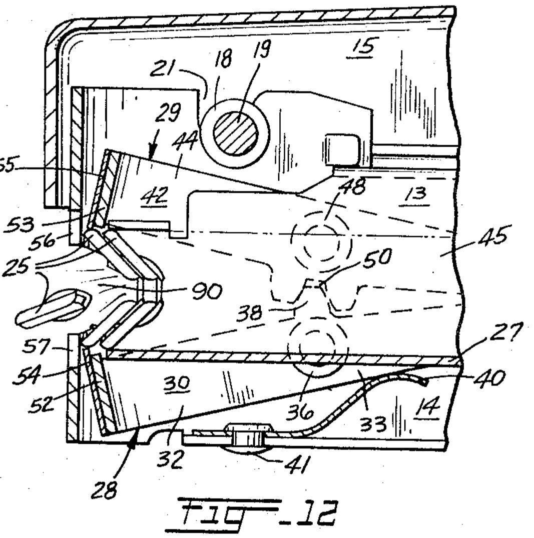
FIG. 12 is a view similar to that of FIG. 10 showing the jaws of the device again in open position, showing the driven security clip expelled therefrom and the next succeeding security clip in position to be driven.
Figure 13:
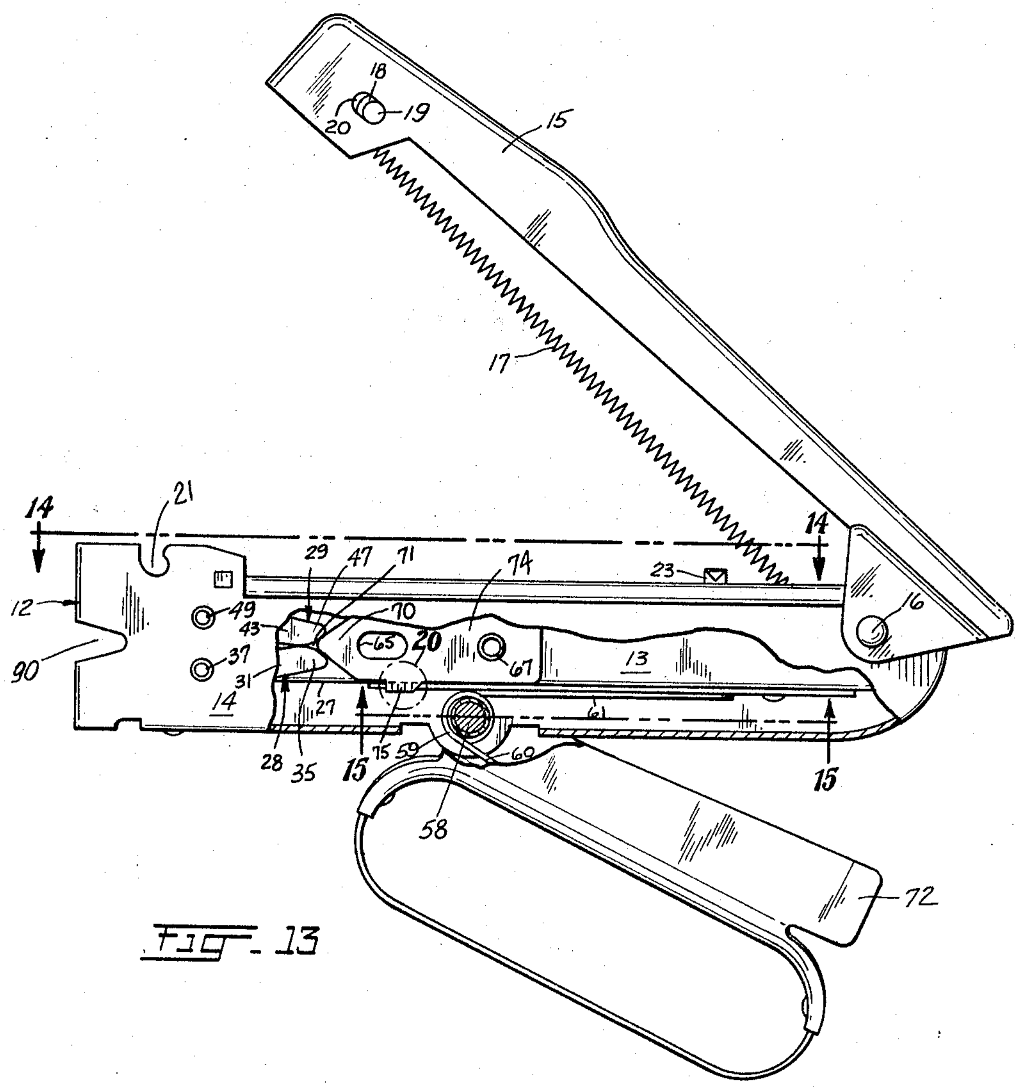
FIG. 13 is a side view, partly in section, of the tool of this invention, with the magazine in open position.
Figure 14:
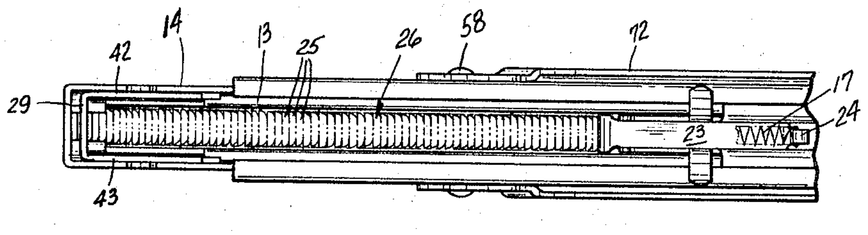
FIG. 14 is a sectional view taken along lines 14—14 of FIG. 13.
Figure 15:
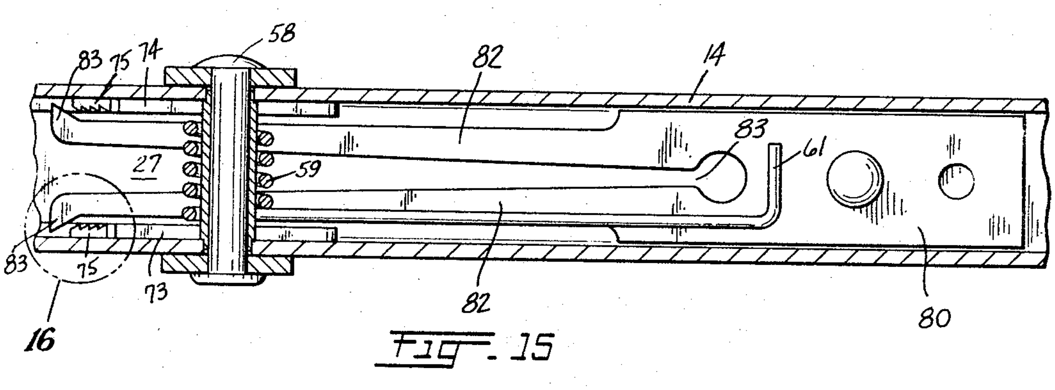
FIG. 15 is a sectional view taken along lines 15—15 of FIG. 13.
Figure 16:
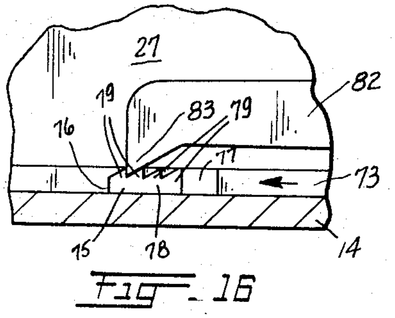
FIG. 16 is a detail view of the area indicated on FIG. 15 but with the ratchet member of the second actuating member of the stroke control mechanism abutting the first tooth of the first actuating member.
Figure 17:
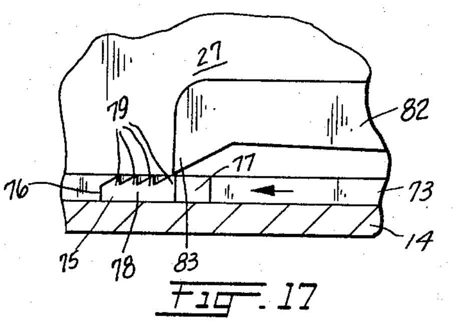
FIG. 17 is a detail view similar to that of FIG. 16 but with the ratchet member leaving the last tooth when the first actuating member moves in a forward direction.
Figure 18:
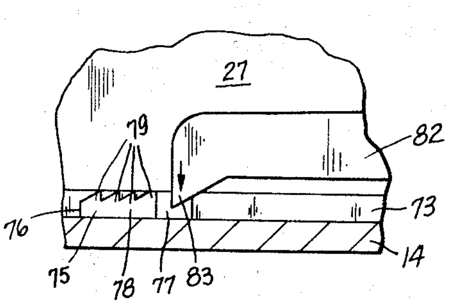
FIG. 18 is a detail view similar to that of FIG. 16 but with the ratchet member abutting the inclined rear face of the first actuating member as the first actuating member continues in a forward direction.
Figure 19:
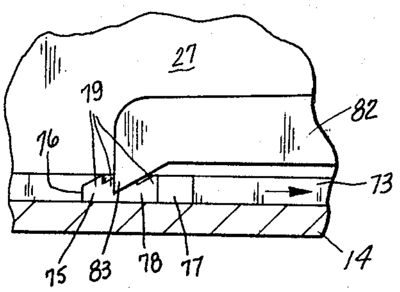
FIG. 19 is a detail view similar to that of FIG. 16 but with the ratchet member abutting the top face of the first actuating member and overpassing the teeth thereof as the first actuating member moves in a rearward direction.

Cover 15 of magazine 12 is opened as shown in FIG. 13 and a strip 26 of clips 25 inserted within upper portion 13. Cover 15 is then closed and latched in the position shown in FIG. 2. Follower 23 then moves forwardly under the pressure of spring 17 and pushes the leading clip 25 into a position adjacent the compressing portions 52 and 53 of jaws 28 and 29. Handle 72 is then moved upwardly in the direction of the arrow shown in FIG. 2. This moves links 73 and 74 forwardly and forces portions 70 forwardly into recesses 71. This moves rear parts 33 and 45 and 35 and 47 outwardly and thus compresses clip 25 between portions 52 and 53 of jaws 28 and 29. Since the same link construction abuts portions 33 and 45 as abuts portions 35 and 47 and since links 73 and 74 are controlled by the same handle member an equal pressure is applied by compressing portions 52 and 53. When clip 25 is in its initial position it is retained between elements 56 and 57. As clip 25 commences to be compressed it is retained in position between elements 54 and 55. When clip 25 is fully compressed it can be released by reopening jaws 28 and 29 as shown in FIG. 12.

In the operation of a device of the class described herein it is important to prevent the tool from being partially actuated so that a clip is partially compressed and then commencing another cycle before the first cycle has been fully completed. In the device of the instant invention the elements 75–83 constitute such stroke control means. As links 73 and 74 move forwardly projection 83 is compressively urged from the front face 76 against the teeth 79. If, at this point, the cycle is stopped, the ratchets 83 holds the device in this position upon the cycle and does not permit another cycle to be commenced until the cycle involved has been completed. As the cycle progresses ratchets 83 leave teeth 79 and abut inclined rear faces 77. When the cycle is completed the rearward motion of links 73 and 74 carry ratchets 83 to the top faces 78 of links 73 and 74 and thus cause an overpassing of teeth 79. When ratchets 83 return to their initial position they are then again adapted to abut teeth 79 on the forward stroke.

Where the instant device is utilized for the specific purpose of applying security clips over the securing means between the end portions of an elongated element (such as about the knot of the string of a conventional string tag used to prevent clothing from being worn and then returned or used to place price information upon such clothing), an opening 90 (preferably a V-shaped recess) is provided within forward portion of magazine 12. The jaws 28 and 29 are disposed adjacent the recess 90. In the operation of this form of the invention the knot and the adjacent portions of the string are disposed within the recess 90. The security device is then clamped by the jaws upon the knot. Thus, the security device can be applied to the string tag in a rapid and simple operation.

The foregoing sets forth the manner in which the objects of this invention are achieved.

I claim:

1. A tool for applying fastening devices comprising an elongated magazine adapted to hold a plurality of such unapplied devices in successive aligned relationship, a pair of pivotally movable complementary jaws at the forward end of said magazine, said jaws each including a pair of laterally disposed spaced actuating portions and a compressing portion joining said actuating portions and extending thereacross, spring means within said magazine connected to one of said actuating portions normally holding a portion of said actuating portions against one another and said compressing portions in spaced relationship with one another, a spring-loaded follower within said magazine adapted to sequentially propel a single unapplied fastening device between the compressing portions of said jaws, stop means carried by said magazine normally preventing said unapplied single fastening device from passing through said jaws, a plurality of forwardly movable spaced wedge-shaped members on opposite sides of said mechanism selectively movable between said actuating portions so as to cause said compressing portions of said jaws to apply equal pressure to the unapplied fastening device therebetween and thus apply the same, pivotally movable handle means operatively connected with said wedge-shaped portions, and spring means normally holding said handle means in open position and said wedge-shaped portions in rearward position.

2. A tool for applying fastening devices comprising a magazine adapted to hold a plurality of unapplied fastening devices in successive aligned relationship, a pair of movable complementary jaws at one end of said magazine, fastening device advancing means operatively connected with said magazine adapted to propel an unapplied single fastening device between said jaws, means for causing said jaws to apply equal pressure to the fastening device therebetween, and stroke control means operatively connected with said jaws preventing more than one unapplied fastening device to intervene said jaws at any one time.

3. A tool for applying fastening devices comprising an elongated magazine adapted to hold a plurality of unapplied fastening devices in successive aligned relationship, a pair of pivotally movable complementary jaws at the forward end of said magazine, said jaws each including a pair of laterally disposed spaced actuating portions having front and rear parts and a compressing portion joining the front parts of said actuating portions to one another and extending thereacross, first leaf spring means within said magazine abutting the rear part of one of said actuating portions, said first spring means normally holding said rear parts of said actuating portions against one another and said compressing portions in spaced relationship with one another; a forwardly movable follower within said magazine, second spring means operatively connected with said follower adapted to sequentially propel a single unapplied fastening device between the compressing portions of said jaws, stop means carried by said magazine normally preventing said unapplied single fastening device from passing through said jaws, a plurality of forwardly movable spaced wedge-shaped members, on opposite sides of said mechanism selectively movable between the rear parts of said actuating portions so as to cause said compressing portions of said jaws to apply equal pressure to the unapplied fastening device therebetween and thus apply the same, stroke control means operatively connected with said wedge-shaped members forcing the completion of a cycle, pivotally movable handle means operatively connected with said wedge-shaped portions, and third spring means normally holding said handle means in open position and said wedge-shaped portions in rearward position.

4. A tool for applying fastening devices comprising an elongated magazine having an upper portion and a lower portion connected to one another, said upper portion adapted to hold a plurality of unapplied fastening devices in successive aligned relationship, a pivotally movable openable cover connected to and normally overlying said magazine, a pair of pivotally movable complementary jaws at the forward end of said magazine, said jaws each including a pair of spaced actuating portions having front and rear parts and a compressing portion joining the front parts of said actuating portions to one another and extending thereacross, said compressing portion having a projecting prong thereupon, first leaf spring means within the lower portion of said magazine abutting the rear part of one of said actuating portions, said first spring means normally holding said rear parts of said actuating portions against one another and said compressing portions in spaced relationship with one another; a forwardly movable follower within the upper portion of said magazine, second coil spring means connected to said follower and to said cover adapted to sequentially propel a single unapplied security device between the compressing portions of said jaws, stop means carried by said magazine preventing said unapplied single fastening device from passing through said jaws in unapplied relationship, a plurality of forwardly movable spaced wedge-shaped members selectively movable between the rear parts of said actuating portions so as to cause said jaws to apply equal pressure to the unapplied fastening device therebetween and thus apply the same, stroke control means operatively connected with said wedge-shaped members forcing the completion of a cycle, said stroke control means comprising a plurality of spaced teeth upon each of said wedge-shaped members and an inclined portion behind said teeth, and a pair of projecting springable members within said magazine each having a prong portion abutting said teeth, pivotally movable handle means operatively connected with said wedge-shaped portions, and third spring means normally holding said handle means in open position and said wedge-shaped portions in rearward position.

5. A stroke control mechanism for a fastening device comprising an actuating member having a plurality of spaced teeth thereupon, an inclined portion behind said teeth and a springable ratchet member having a point thereupon abutting said teeth.

6. A stroke control mechanism for a fastening device comprising a first slidable actuating member having a projecting portion thereupon, said projecting portion having a top face, a substantially right-angled front face, an inclined rear face abutting said top face and a plurality of spaced teeth intervening said front face and said rear face and parallel with said front face, and a second springable actuating member having a ratchet portion abuttable with said teeth and thence abuttable with said inclined portion, when said first actuating member moves in one direction the ratchet portion of said second actuating member abutting said top face and overpassing said teeth when said first actuating member moves in the opposite direction.

7. In a fastening device having a magazine adapted to carry a plurality of fastening elements and driving means operatively connected with said magazine adapted to sequentially drive said fastener elements, a stroke control mechanism comprising a first slidable actuating member having a projecting portion thereupon, said projecting portion having a top face, a substantially right angled front face, an inclined rear face abutting said top face and a plurality of spaced teeth intervening said front face and said rear face and parallel with said front face, and a second springable actuating member having a ratchet portion abuttable with said teeth but thence abuttable with said inclined portion when said first actuating member moves in one direction, the ratchet portion of said second actuating member abutting said top face and overpassing said teeth when said first actuating member moves in one direction.

8. In a fastening device having a magazine adapted to carry a plurality of fastening elements, driving means and fastener feeding means operatively connected with said magazine and means for actuating said driving means, the improvement which comprises a stroke control mechanism comprising a first movable actuating member having a portion thereupon formed with a top face, a substantially right angled front face, an inclined rear face abutting said top face and a plurality of spaced teeth intervening said front face and said rear face and parallel with said front face and a second springable actuating member having a ratchet portion abuttable with said teeth but thence abuttable with said inclined portion when said first actuating member is moved in one direction, the said ratchet portion abutting said top face and overpassing said teeth when said first actuating member moves in the opposite direction.

9. A tool for applying a security device about the means securing the end portions of an elongated element to one another comprising an elongated magazine having an upper portion and a lower portion connected to one another, said upper portion adapted to hold a plurality of unapplied security devices in successive aligned relationship, a pivotally movable openable cover connected to and normally overlying said magazine, a substantially V-shaped recess at the forward end of said magazine adapted to accommodate the part of an elongated element securing the end portions thereof to one another, a pair of pivotally movable complementary jaws at said forward end of said magazine adjacent said V-shaped recess, said jaws each including a pair of spaced actuating portions having front and rear parts and a compressing portion joining the front parts of said actuating portions to one another and extending thereacross, said compressing portion having a projecting prong thereupon, first leaf spring means within the lower portion of said magazine abutting the rear part of one of said actuating portions, said first spring means normally holding said rear parts of said actuating portions against one another and said compressing portions in spaced relationship with one another; a forwardly movable follower within the upper portion of said magazine, second coil spring means connected to said follower and to said cover adapted to sequentially propel a single unapplied security device between the compressing portions of said jaws, stop means carried by said magazine preventing said unapplied single security device from passing through said jaws in unapplied relationship, a plurality of forwardly movable spaced wedge-shaped members selectively movable between the rear parts of said actuating portions so as to cause said jaws to apply equal pressure to the unapplied security device therebetween and thus apply the same, stroke control means operatively connected with said wedge-shaped members forcing the completion of a cycle, said stroke control means comprising a plurality of spaced teeth upon each of said wedge-shaped members and an inclined portion behind said teeth, and a pair of projecting springable members within said magazine each having a prong portion abutting said teeth, pivotally movable handle means operatively connected with said wedge-shaped portions, and third spring means normally holding said handle means in open position and said wedge-shaped portions in rearward position.

10. A tool for applying fastening devices comprising a mechanism adapted to hold said devices in successive aligned relationship, a follower within said mechanism, a pair of movable complementary jaws at one end of said mechanism and extending thereacross, a pair of laterally disposed actuating members connected to said jaws and disposed on opposite sides of said mechanism, and means for moving said actuating members so as to cause said jaws to compress about said devices.

References Cited

UNITED STATES PATENTS

| | | | |
|---|---|---|---|
| 1,199,653 | 9/1916 | Bacolini | 72—424 |
| 2,539,313 | 1/1951 | Miller | 72—424 |
| 2,767,400 | 10/1956 | Haberstump | 72—424 |
| 3,047,874 | 8/1962 | Kelsey | 72—424 |

CHARLES W. LANHAM, *Primary Examiner.*

R. D. GREFE, *Assistant Examiner.*